United States Patent [19]

Darbo

[11] Patent Number: 4,851,064
[45] Date of Patent: Jul. 25, 1989

[54] TEAR-OFF TAPE AND METHOD OF MAKING THE SAME

[76] Inventor: Howard H. Darbo, 120 Windsor Park Dr., Apt. A114, Carol Stream, Ill. 60188

[21] Appl. No.: 209,094

[22] Filed: Jun. 17, 1988

Related U.S. Application Data

[62] Division of Ser. No. 18,017, Feb. 24, 1987.

[51] Int. Cl.⁴ .............................................. B32B 31/16
[52] U.S. Cl. .................................... 156/153; 156/154; 156/250; 156/252; 156/253; 428/43
[58] Field of Search ............... 156/153, 154, 252, 253, 156/250; 428/43

[56] References Cited

U.S. PATENT DOCUMENTS 2,303,144 11/1942 Stephenson ........................... 428/43
2,508,855 5/1950 Brown ................................... 428/43

FOREIGN PATENT DOCUMENTS 2909276 9/1980 Fed. Rep. of Germany ........ 428/43

Primary Examiner—Caleb Weston
Attorney, Agent, or Firm—Lee & Smith

[57] ABSTRACT

The product of the invention is a plastic tape, for example pressure sensitive plastic adhesive tape, which can easily be manually torn, as from a supply roll, without the use of any tool. At least one edge of the tape is provided with a series of closely spaced points of weakness by cutting or tearing therein shallow slits or notches at which tearing can be easily initiated. Such points of weakness may be formed in the tape prior to rolling into a supply roll or may be imposed by working the flat side of a roll with sharp grit sandpaper or the like or by cutting means.

1 Claim, 1 Drawing Sheet

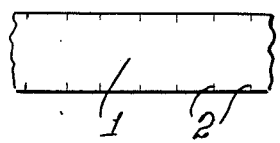
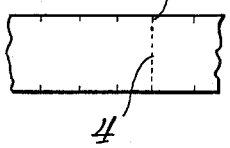
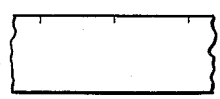
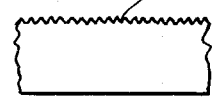
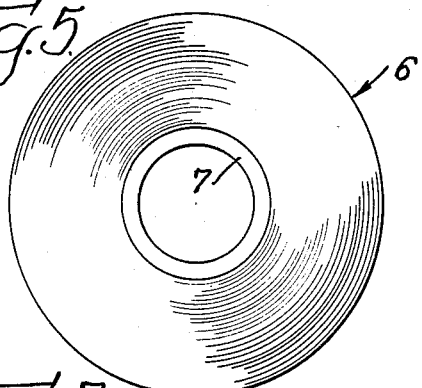
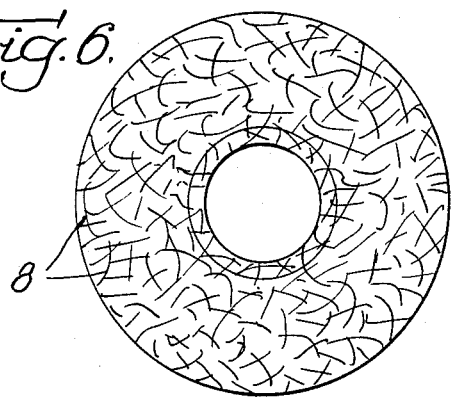
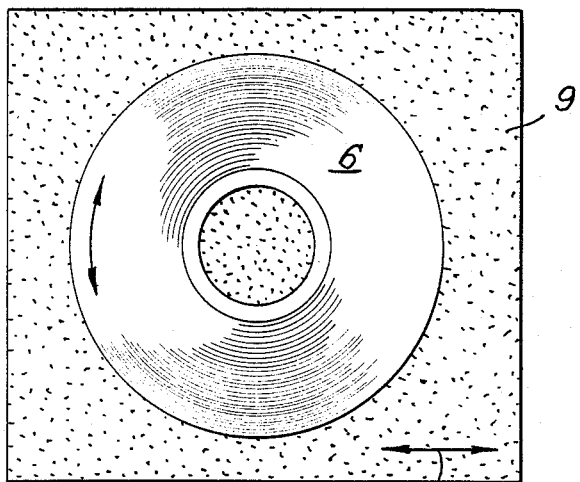
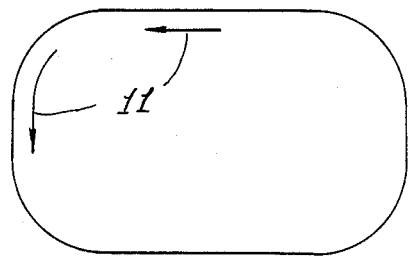
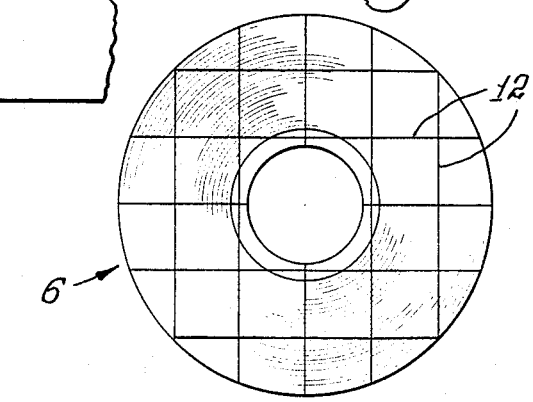
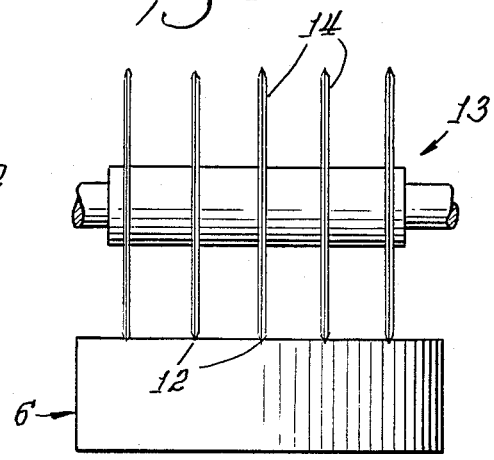

TEAR-OFF TAPE AND METHOD OF MAKING THE SAME

This application is a division of application Ser. No. 018,017 filed Feb. 24, 1987.

BACKGROUND AND SUMMARY OF THE INVENTION

For many years so called "friction tape" was used to hold small parts together, as an electrically insulating material to cover otherwise exposed electrical conductors, especially at wire-to-wire connections, and for many other purposes. Friction tape was made by impregnating a woven cloth material with a black, non-drying adhesive material. The tape was normally supplied in rolls of varying widths from which supply the desired length of tape would be withdrawn for use and easily cut or simply torn off. If dispensers were used, they were more for convenience in holding a roll or rolls of tape than for severing it as desired because the tape was so easily torn.

With the coming of the plastic age, plastic film of various compositions were and are employed in place of the woven fabric and one or both sides of the plastic film were coated with a pressure sensitive adhesive material. This product had the advantages of lower cost and also greater conformability with the contours of the surfaces to which the tape was applied. A disadvantage of the plastic pressure sensitive tape has been the greater difficulty of tearing the portion of the tape to be used from the supply roll dispenser which holds the supply roll and usually includes means for severing the tape as required. Rolls of the tape for electrical, mechanical and securing means were also supplied for use without the cutter-dispensers, a knife, scissors, or other tool that might be available at the moment being used to cut the tape. Attempts to tear a piece of pressure sensitive plastic adhesive tape, as had theretofore been done with friction tape, frequently meant only frustration. Except when applied by an experienced person as a quick snap exerted at the very edge of the tape, tensile forces tended only to stretch instead of rupturing the tape.

As used herein, the term "plastic tape" means a flexible strip of plastic film having an essentially constant width and initially a length which is a large positive multiple of its width. The term "tear-off tape" means tape which may be readily severed by manual manipulation without the use of any cutting tool.

The object of the present invention is to provide pressure sensitive plastic adhesive tape which can be easily torn to separate a desired length for use from the supply roll. More specifically, a tape of this kind is provided with closely spaced points of weakness along at least one of the edges of the tape these points being formed by tiny notches shallow cuts or tears which have the effect of concentrating the forces of tension applied at the edge of the tape at one of the tiny notches at which point of weakness the tear is started. Once started, completion of the tear proceeds easily. The tiny notches or shallow cuts or tears may be provided inexpensively by diverse means some of which are described hereinbelow by way of example.

In one aspect of the invention, a simple and inexpensive method of producing a roll of easily severable tape from a normal roll of normal pressure sensitive plastic adhesive tape is described. This may be done by applying a sharp grit sandpaper to the side surface of a normal roll of plastic tape and working the surface by abrading it with appropriate pressure in haphazard directions to scratch the surface formed by the collective edges of the convolutions of the tape forming the roll and thus introducing the multiplicity of closely spaced points of weakness as required by the easy tear-off of the tape of the invention.

BRIEF DESCRIPTION OF THE DRAWINGS

FIGS. 1 through 4 illustrate segments of plastic tape embodying the invention, FIG. 2 showing in doted lines the probable course of a tear initiated at a particular point of weakness;

FIG. 5 is a side view of a typical prior art roll of plastic tape;

FIG. 6 is a view similar to that of FIG. 5 but showing the side of the roll haphazardly scratched to provide a multiplicity of points of weakness;

FIG. 7 is a side view of a roll of plastic tape like that illustrated in FIG. 5 and having its unseen side in pressure contact with sandpaper or the like arranged for reciprocating working movement;

FIG. 8 is a diagramatic illustration of the motion of the working sandpaper surface of orbital sander;

FIG. 9 illustrates a segment of plastic tape taken from a roll after surface treatment by sandpaper or the like;

FIG. 10 is a side view of a roll of plastic tape having spaced cuts in its face in two directions, and FIG. 11 is a side view of a gang disc cutting wheel in cutting contact with the side of a roll of plastic tape.

DESCRIPTION OF MODES BEST EMBODYING THE INVENTION

The essence of the invention comprises the provision of spaced points of weakness along at least one edge of plastic tape e.g., pressure sensitive plastic adhesive tape, to permit the severing of the tape at a selected location manually without the use of a tool of any kind. Several examples of edge-weakening structural forms are described and exemplary methods of formation of the same are shown and described.

At the outset, it is noted that the invention herein described is applicable to unreinforced plastic tape; that is plastic film which is not provided with longitudinal filaments having sufficient strength in tension to substantially enhance the strength of the tape. The severing of such reinforced plastic tape requires cutting of the filaments. It should also be noted, as a general overview commentary, that the tape of the invention may be provided with the points of weakness either before or after the tape is rolled into its final product form.

When stressed in tension, plastic tape will stretch and/or rupture depending upon the composition of the particular plastic material and its thickness, and also upon the magnitude of the applied force and also the speed with which the force is brought to bear. The force at which the plastic tape will rupture also depends upon the location of application of the tensile forces. As is well known, an uninterrupted edge of plastic tape resists rupture so that a piece of tape can be torn from a supply roll only with a snap application of very substantial force. This is something of a "trick" and most users must employ cutting means to detach a piece of tape from the supply roll.

Referring to the drawing, FIG. 1 illustrates a segment 1 of plastic tape which is provided with spaced slits 2 along both edges of the tape. Being very shallow, the slits do not appreciably weaken the overall strength of the tape but the slits do introduce points of weakness at the extreme edge portions of the tape. The manual application of tension to the edge of the tape results in the initiation of a cross tear at the bottom of the slit at which the tensile force is concentrated. The course of the tear may originate, for example, at slit 3, FIG. 2, along the dotted line 4 to the opposite edge of the tape which might or might not be at the location of another slit. The same result would be achieved in a tape, such as that illustrated in FIG. 3, which is provided with the slit points of weakness along only one edge of the tape.

The points of weakness may be imposed into the edge portion of the plastic tape by means other than slitting as just described. In FIG. 4, the edge is cut to provide a continuing series of notches 5 which are very shallow but are preferably formed with sharp valleys. This tape may also be easily severed by a manually applied pull at the weakened edge.

The series of slits or notches shown in FIGS. 1–4 may be cut into the edge or edges of the plastic tape either prior to or after rolling it into the final roll product.

The easy tear-off tape of the invention may be made at minimal cost by abrading or grossly scratching the side surface of a normal roll of plastic tape to produce a multiplicity of shallow slits or sharp notches in the edges of the convolutions of the tape. This can be simply done by working the roll surface with coarse sandpaper or similar sheet form abrasive material. Such haphazard scratching of the surface imposes the needed points of weakness in the edge of the tape at which the tape may easily be torn as desired.

As shown in FIG. 7, the normal roll 6 of plastic tape may be brought into pressure engagement with the abrasive face 9 of a power sander. If the sander is of the reciprocating kind, as indicated by arrow 10, the roll 6 should be rotated at least a quadrant during the abrading operation so that the abrasive particles will move crosswise of the tape convolutions throughout the side of the roll. If an orbital type of power sander is used, the abrading particles travel in the orbital path indicated by arrows 11 as illustrated in FIG. 8 and rotation of the roll on the abrading surface is unnecessary.

It is desirable that the side surfaces of the rolls of plastic tape be sharply scratched in the abrading process so that the resulting indentations in the edges of the plastic tape comprise sharp notches as the points of weakness. This can be accomplished by the use of sandpaper or emery or garnet paper or cloth having sharp, relatively coarse, abrasive grit particles. An example of the easy tear tape made in this way is illustrated in FIG. 9.

Another example of means for forming the tear-off tape of the invention is illustrated in FIGS. 10 and 11. Spaced shallow slits 12 may be cut into the side surface of roll 6 of plastic tape by a gang 13 of rotary cutting wheels 14. After cutting into the surface of the side of the roll in one direction, the roll may be rotated ninety degrees to provide similar spaced slits at right angles to those already formed. In this way, each convolution of plastic tape is provided at its edge with spaced slits which form the points of weakness at which the tape can be torn.

Other methods of providing the normal plastic tape with the edge points of weakness may be adapted to normal established procedures of making the tape and rolls thereof to render the tape easily tearable as desired in accordance with the invention.

ACHIEVEMENT

The invention herein described solves the long standing and often vexing problem of severing a desired length of plastic tape e.g., pressure sensitive plastic adhesive tape, from a supply roll without the need of a knife or scissors. By a simple operation on normal pressure sensitive plastic tape or a roll thereof, plastic pressure sensitive adhesive tape may be supplied to users in a form that is much more acceptable and satisfying to the users in that the tape may be easily torn from the supply role using only the fingers and thumbs. This important advantage is attained without appreciably weakening or otherwise adversely affecting the quality of the tape.

I claim:

1. The method of making a supply roll of tear-off plastic tape having a continuous series of spaced points of weakness along at least one edge thereof which method comprises the steps of first forming a roll of plastic tape having a flat side surface and thereafter making a multiplicity of shallow tears into said flat side surface of said roll by working said surface with sheet form abrasive material having sharp relatively coarse abrasive grit particles to form the points of weakness along the edges of said tape which form said surface.

* * * * *